(12) United States Patent
Tüner

(10) Patent No.: US 12,177,307 B2
(45) Date of Patent: Dec. 24, 2024

(54) DIGITAL MEDIA DISTRIBUTION FREQUENCY MANAGEMENT SYSTEMS AND METHODS FOR REDUCING DIGITAL MEDIA ACROSS DIGITAL NETWORKS AND PLATFORMS

(71) Applicant: The Procter & Gamble Company, Cincinnati, OH (US)

(72) Inventor: Umur Tüner, Geneva (CH)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 18/072,760

(22) Filed: Dec. 1, 2022

(65) Prior Publication Data

US 2023/0179674 A1    Jun. 8, 2023

Related U.S. Application Data

(60) Provisional application No. 63/285,554, filed on Dec. 3, 2021.

(51) Int. Cl.
*H04L 67/50* (2022.01)

(52) U.S. Cl.
CPC .................................. *H04L 67/535* (2022.05)

(58) Field of Classification Search
CPC .............. H04L 67/535; G06Q 30/0275; G06Q 30/0242; G06Q 30/0269; G06Q 30/0277
USPC ......................................................... 709/217
See application file for complete search history.

(56) References Cited

U.S. PATENT DOCUMENTS

| 9,589,278 | B1 | | 3/2017 | Wang | |
|---|---|---|---|---|---|
| 10,706,450 | B1 | | 7/2020 | Tavernier | |
| 11,564,012 | B1 | * | 1/2023 | Holton | ............... H04N 21/4667 |
| 2008/0288349 | A1 | * | 11/2008 | Weisberg | ........... G06Q 30/0277 |
| | | | | | 705/14.54 |

(Continued)

FOREIGN PATENT DOCUMENTS

| CA | 2803786 A1 * | 12/2011 | ......... G06F 21/6245 |
|---|---|---|---|
| WO | WO-2023101656 A1 * | 6/2023 | ......... G06F 21/6263 |

OTHER PUBLICATIONS

All Office Actions; U.S. Appl. No. 18/319,656, filed May 18, 2023.

(Continued)

*Primary Examiner* — Hee Soo Kim
(74) *Attorney, Agent, or Firm* — Daniel S. Albrecht

(57) ABSTRACT

Digital media distribution frequency management systems and methods are disclosed for reducing digital media across digital networks and platforms. A set of impression identifiers (IDs) is determined for a digital media asset as displayed on graphic user interfaces (GUIs) of open web digital channel(s). An identifier of a user is determined as well as an impression count of the user based on the set of impression IDs and an open web ID of the user. An impression frequency message is pushed to an application programming interface (API) of an online based digital media content distribution platform. The impression frequency message may comprise the identifier of the user. The online based digital media content distribution platform is configured to suppress or allow the digital media asset to be displayed to the user on a GUI of the online based digital media content distribution platform based on the impression frequency message.

16 Claims, 7 Drawing Sheets

(56) References Cited

U.S. PATENT DOCUMENTS

| | | | | |
|---|---|---|---|---|
| 2010/0161419 A1* | 6/2010 | Tomlin | ............... | G06Q 30/0257 |
| | | | | 705/14.55 |
| 2012/0066066 A1* | 3/2012 | Jain | ................... | G06Q 30/0261 |
| | | | | 707/E17.084 |
| 2012/0253926 A1* | 10/2012 | Chen | ...................... | G06Q 10/06 |
| | | | | 705/14.49 |
| 2012/0323702 A1* | 12/2012 | Puentes | ................. | G06Q 30/02 |
| | | | | 705/14.71 |
| 2014/0304061 A1* | 10/2014 | Bruich | ............... | G06Q 30/0242 |
| | | | | 705/14.41 |
| 2015/0170200 A1* | 6/2015 | Rajkumar | .......... | G06Q 30/0251 |
| | | | | 705/14.49 |
| 2017/0372376 A1* | 12/2017 | Scharf | ................ | G06Q 30/0273 |
| 2019/0295122 A1* | 9/2019 | Kumar | ............... | G06Q 30/0244 |
| 2020/0202370 A1* | 6/2020 | Sheppard | ................ | G06F 17/16 |
| 2020/0204746 A1 | 6/2020 | Kang | | |
| 2020/0219129 A1* | 7/2020 | Andrades | ........... | G06Q 30/0246 |
| 2020/0219142 A1* | 7/2020 | Andrades | ............... | G06Q 30/08 |
| 2020/0219143 A1* | 7/2020 | Mak | ....................... | G06Q 30/08 |
| 2020/0219144 A1* | 7/2020 | Mak | .................. | G06Q 30/0275 |
| 2020/0219145 A1* | 7/2020 | Kalampoukas | .... | G06Q 30/0277 |
| 2023/0186327 A1* | 6/2023 | Robinson | ........... | G06Q 30/0201 |
| | | | | 705/7.29 |

OTHER PUBLICATIONS

Unpublished U.S. Appl. No. 18/319,656, filed May 18, 2023, to Umur Tuener.

* cited by examiner

Sample Query for converting td id into MAID

```
create external table p_eu_media.eu_maid_exclusion_pants_20210204 (maid string)
stored as textfile location '/poc/eu_media/data/eu_maid_exclusion_pants_20210204';

set mem_limit=50g;
insert into table p_eu_media. eu_maid_exclusion_pants_20210204
select c.tdid, a.maid
from (select ind_id, device_id as maid from f_idgraph_tapad. idgraph_cumulative_star
where last_file_date = '2021-02-04' and region_code = 'eu_combined'
and(device_type_code = 'HARDWARE_IDFA' or device_type_code = 'HARDWARE_ANDROID_AD_ID')) a
join
(select ind_id, device_id as tdid from f_idgraph_tapad. idgraph_cumulative_star
where last_file_date = '2021-02-04' and region_code = 'eu_combined'
and device_type_code = 'TTD') b
on a.ind_id= b.ind_id
join
(select distinct tdid
from f_dsp_tradedesk.impression_event_star where campaign_id="Pants sample campaign"
and impression event tmstp > 2021-01-29) c on c.tdid=b.tdid
```

- 602: create external table...
- 604: set mem_limit=50g;
- 606: join (select ind_id...
- 608: join (select distinct tdid...

FIG. 6

DIGITAL MEDIA DISTRIBUTION FREQUENCY MANAGEMENT SYSTEMS AND METHODS FOR REDUCING DIGITAL MEDIA ACROSS DIGITAL NETWORKS AND PLATFORMS

CROSS REFERENCE TO RELATED APPLICATION

This application claims the benefit, under 35 U.S.C. § 119(e), of U.S. Provisional Patent Application No. 63/285,554, filed on Dec. 3, 2021, the entire disclosure of which is hereby incorporated by reference.

FIELD

The present disclosure generally relates to digital media distribution frequency management systems and methods, and more particularly to, digital media distribution frequency management systems and methods for reducing digital media across digital networks and platforms.

BACKGROUND

Modern Internet communications typically involve various platforms and servers in communication with each other. Such platforms and servers typically comprise their own internal networks, subnetworks, or other computer networks and resources that share information and content, which may include digital media assets. Digital media assets typically comprise data-rich digital payload content, such as images, video, text, audio, and the like. The digital media assets may take on various forms, including digital infographics, advertisements (ads), or the like, and take up sizeable bandwidth or otherwise computational resources to transmit via a computer network, such as the Internet or subnetworks thereof, including private and/or public networks thereof.

In particular, digital media asset distribution typically involves dissemination of digital media assets across several computer networks in order to arrive at an intended destination (e.g., an edge computer device). Such dissemination of data-rich content can reduce network resources or take up bandwidth otherwise within a given computer network. This can be problematic when the distribution or dissemination of such digital media assets is redundant, thereby causing the digital media assets to be needlessly transmitted on computer networks to and displayed on edge devices. This can be especially problematic given that online platforms are typically controlled, hosted, or otherwise maintained by separate entities that do not share dissemination or distribution information with one another, which causes increased network traffic when a need exists to ensure that digital media assets are transmitted, received, and displayed to end-users on these digital platforms. Such redundant distribution and dissemination results in digital waste, including over-utilization of network bandwidth and the creation of needless digital network traffic. It also creates frustration on the part of end-users whose devices must render redundant digital media content.

For the foregoing reasons, there is a need for digital media distribution frequency management systems and methods for reducing digital media across digital networks and platforms, as further described herein.

SUMMARY

Digital media distribution frequency management systems and methods are described herein for reducing digital media across digital networks and platforms. The digital media distribution frequency management systems and methods, as described herein, comprise implementing systems that enable omni-channel digital asset deduplication by providing frequency management in computer networks. This minimizes digital waste by excluding, from transmission in the computer network, digital media assets (such as digital ads that comprise graphics, images, text, audio, etc.) that would otherwise be transmitted and/or displayed or rendered on various computing devices connected to the computer network. For example, a user who received and saw rendered a given digital media asset previously (e.g., for a certain number of times), can be excluded from receiving the same digital media asset across the computer network thereby reducing redundant, multiple digital touchpoints across the network.

The digital media distribution frequency management systems and methods described herein may be implemented in various computing algorithms or implementations, which are referred to herein as "degrees," "degree implementations," or "degree approaches," which are summarized below and further described, in greater detail, with respect to Figures (FIGS. 3-5 and elsewhere herein.

Degree 1 Implementation

An objective of the first degree implementation is to reduce computer network impact, such as via a reduction of transmission of redundant digital media assets, via high traffic online based digital media content distribution platform (e.g., such as platforms hosted by FACEBOOK and GOOGLE) when end-users have been already exposed to a given number (e.g., a threshold number) of digital media asset impressions. Users may be exposed to digital media asserts via transmission over a computer network and display or rendering on their respective end-use or edge devices (e.g., a mobile device). While the first degree implementation receives open web information (e.g., from the TTD platform) in parallel, and thus, from time-to-time may transmit more than the threshold number of digital assets than desired for a given impression threshold, the first degree approach nonetheless reduces unwanted impressions in the computer. The first degree implementation does so by determining impression thresholds based on open web data alone (e.g., impression data as received from the TTD platform).

As an overview, the first degree approach comprises where, by way of non-limiting example, open web data, such as impression data from open web platforms as aggregated by the TRADEDESK (referred to as "TTD" herein), flows into a server, such as a distribution server or cloud-platform as described herein. Such open web data may be mapped or converted to determine users or user devices, e.g., such as converting or mapping open web data to mobile ad identifiers (MAIDs) to establish a matching rate percentage that identifies a user and the number of impressions of one or more digital media assets and related campaigns for the given user. Such mapped or converted data may be consented data, i.e., data that that users have consented to allow to be collected. The distribution server may generate audience or target lists or tables by selecting identifiers (e.g., MAIDS) that correspond to built-in formula logic (e.g., to determine which users or audience should be allowed to receive a digital asset, or to determine for which users or audience members to suppress the digital media asset). Such target or audience lists may then be created by selecting corresponding identifiers (e.g., MAIDS) that fit into built in formula logic. These lists and/or tables are then pushed, via an automated process, to the online based digital media content distribution platform(s) (e.g., the FACEBOOK and/ or GOOGLE platforms) via dedicated APIs with a frequency close to real time (e.g., approximately 30 minutes). The first degree implementation described further herein for FIG. 3 regarding digital media distribution frequency management method 300.

The first degree implementation has resulted in improved efficiencies compared to a control test (no implementation used), where the first degree implementation resulted in 46% less data touch points based on fewer digital media assets being transferred across a computer network and rendered on an end-user device, thereby decreasing excessive impression frequency. Preventing excessive impressions results in decreasing the number of data exchanges and interactions that would otherwise need to be performed across the computer network and on the underlying computing devices (e.g., servers and mobile devices) that are involved in the delivery, transmission, and rendering of such digital media assets.

In addition, the first degree implementation resulted in increased security as the impression data (e.g., as reported from multiple sources) may be maintained and analyzed in a central location (a distribution server for determining when to allow or exclude transmission of digital media assets). This results in increased data security compared to data otherwise being spread across various devices on a computer network.

In addition, implementation of the first degree approach resulted in a decrease of about approximately eight (8) digital media assets per user as transferred across a computer network and as displayed on a user computing device. Further, this resulted in an increase of user satisfaction (with users experiencing less frequency of redundant digital media assets), and thereby increasing the corresponding click through rate by 22%.

Degree 2 Implementation

An objective of the second degree implementation is to also consider impression data of online based digital media content distribution platform(s). For example, the second degree implementation builds upon the first degree implementation and performs an automatic check of impression data of digital media content distribution platform(s) (e.g., the FACEBOOK and/or GOOGLE platforms) every 30 minutes in order to consider impression data as captured and/or stored by those platforms.

As an overview, the second degree approach comprises, by way of non-limiting example, creation of an identifier table. The second degree approach further comprises, for example, transmitting the identifier table to the digital media content distribution platform(s) for on-platform suppression or allowance of transmission of digital media assets. For example, a main difference between the first degree implementation and the second degree implementation is that an identifier table (e.g., a MAID impression table) counting a number of open web ID impressions transmitted and/or displayed for a given user (e.g., as determined from TTD impression) in a certain time period (e.g., in last 7 days) is generated and provided to the digital media content distribution platform(s) for determination of suppression and/or allowance on-platform. In the second degree implementation, the digital media content distribution platform(s) imports the table or list data and is able to match the identifiers (e.g., MAIDs) with impression data (e.g., identifiers) as stored on their respective platforms. This results in the identification of digital media assets, as transmitted and/or displayed at the campaign and/or user level, in order to determine a total impression count across the open web platforms and the given digital media content distribution platform (e.g., the FACEBOOK platform). In the second degree implementation, the digital media content distribution platform(s) may select the identifiers who exceed a given threshold to determine which digital media assets to suppress or allow, e.g., by creating a conversion event (used to set target audience) or directly create an audience from these IDs on-platform. The second degree implementation described further herein for FIG. 4 regarding digital media distribution frequency management method 400.

The second degree improves upon the first degree implementation by reducing digital media asset network traffic and impressions by allowing for threshold amounts of impressions to be more accurately achieved. With the second degree implementation, frequency management involves a hybrid approach where the distribution server provides an initial list of user identifiers (e.g., MAIDs) that is provided to digital media content distribution platform(s). The digital media content distribution platform(s) supplement the use of these identifiers based on their own captured and/or stored impression data. This allows the second degree implementation to operate with additional impression data compared to the first degree approach, such that impressions are tracked and managed in a more accurate manner as they are transmitted and/or rendered in real-time or near-real time to user computing devices. This results in a greater percentage reduction or suppression of excessive digital media asset frequencies, which increases software efficiency and effectiveness of each of the distribution server, the digital media content distribution platform(s), and the computer network as a whole.

The second degree implementation experiences the same security benefits as described for the first degree implementation.

In addition, results of implementation of the second degree approach caused a decrease of about approximately twelve (12) digital media assets per user as transferred across a computer network and as displayed on a user computing device. Further, this resulted in an increase of user satisfaction (with customers experiencing less frequency of redundant digital media assets), and thereby increasing the click through rate by 17% over the first implementation approach.

Degree 3 Implementation

An objective of the third degree implementation is to further improve the efficiency and accuracy of each of the first and second degree implementations by creating a feedback loop between the digital media content distribution platform(s) and the distribution server. The third degree implementation allows for exact, or at least near exact, suppression of digital media assets to a set threshold value thereby allowing precise control of the total number of impressions of digital media assets as transmitted in the computer network and, therefore, displayed or rendered on edge devices (e.g., client devices).

As an overview, the third degree approach comprises, by way of non-limiting example, collecting impression data as described for each of the first and second degree approaches. In one example, a third-party server (e.g., such as FLASH-TALKING server) may receive the impression data from digital media content distribution platform(s) that may provide an identifier table identifying users, impressions, and related campaigns regarding digital media assets. Additionally, or alternatively, the distribution server may receive or inset impression data as part of an identifier (ID) graph which may be converted or mapped to generate or form an identifier table (e.g., an identifier table, such as a MAID table that identifies users, impressions, and related campaigns regarding digital media assets). Once the identifier table is generated, target audiences, for given user, may be determined by selecting identifiers (e.g., MAIDs) via formula logic. The table or otherwise list of target audience may then be pushed to digital media content distribution platform(s) (e.g., TTD, FACEBOOK, and/or GOOGLE) via respective APIs for suppression or allowance of digital media asset transmission on computer networks. The third degree implementation described further herein for FIG. 5 regarding digital media distribution frequency management method 500.

The third degree implementation can result in improved efficiencies compared to each of the first and second degree implementations as frequency management allows for reduction in impressions and related digital media asset transmission in real time or near real time, and results in the greater percent reduction of excessive transmission of digital media assets. This results in improved software efficiency and effectiveness of each of the distribution server, the digital media content distribution platform(s), and the computer network as a whole.

Security is further improved over the first and second degree approaches by minimizing information security risk by reduction of the data footprint by aggregating all personalized data in central distribution sever, and by transmitting a subset of data as determined from the corresponding identifier table or list.

In addition, results of implementation of the third degree approach can cause a decrease of about approximately sixteen (16) digital media assets per user as transferred across a computer network and as displayed on a user computing device. Further, this resulted in an increase of user satisfaction (with users experiencing less frequency of redundant digital media assets) compared with either of the first or second degree approaches, and thereby increasing click through rate by 34% over the first implementation approach.

Each of the various degrees are described herein regarding digital media distribution frequency management systems and methods.

More specifically, as described herein, a digital media distribution frequency management method is disclosed for reducing digital media across digital networks and platforms. In various aspects, the digital media distribution frequency management method comprises determining a set of impression identifiers (IDs) of a digital media asset as displayed on one or more graphic user interfaces (GUIs) of one or more open web digital channels. The digital media distribution frequency management method may further comprise determining an identifier of a user, and an impression count of the user based on the set of impression IDs and an open web ID of the user. The impression count may define a number of times the digital media asset has been displayed to the user via the one or more GUIs of the one or more open web digital channels. The digital media distribution frequency management method may further comprise pushing an impression frequency message to an application programming interface (API) of an online based digital media content distribution platform. The impression frequency message may comprise the identifier of the user. The online based digital media content distribution platform may be configured to suppress or allow the digital media asset to be displayed to the user on a GUI of the online based digital media content distribution platform based on the impression frequency message.

In addition, as described herein, a digital media distribution frequency management system is disclosed. The digital media distribution frequency management system is configured to reduce digital media across digital networks and platforms. In various aspects, the digital media distribution frequency management system may comprise a server comprising one or more processors and one or more memories. The digital media distribution frequency management system may further comprise computing instructions stored on the one or more memories of the server, and when executed by the one or more processors, may cause the one or more processors to determine a set of impression identifiers (IDs) of a digital media asset as displayed on one or more graphic user interfaces (GUIs) of one or more open web digital channels. The computing instructions when executed by the one or more processors may further cause the one or more processors to determine an identifier of a user, and an impression count of the user based on the set of impression IDs and an open web ID of the user. The impression count may define a number of times the digital media asset has been displayed to the user via the one or more GUIs of the one or more open web digital channels. The computing instructions when executed by the one or more processors may further cause the one or more processors to push an impression frequency message to an application programming interface (API) of an online based digital media content distribution platform. The impression frequency message may comprise the identifier of the user. The online based digital media content distribution platform may be configured to suppress or allow the digital media asset to be displayed to the user on a GUI of the online based digital media content distribution platform based on the impression frequency message.

Further, as described herein, a tangible, non-transitory computer-readable medium storing instructions for reducing digital media across digital networks and platforms is disclosed. The instructions, when executed by one or more processors, may cause the one or more processors to determine a set of impression identifiers (IDs) of a digital media asset as displayed on one or more graphic user interfaces (GUIs) of one or more open web digital channels. The instructions, when executed by one or more processors, may further cause the one or more processors to determine an identifier of a user, and an impression count of the user based on the set of impression IDs and an open web ID of the user. The impression count may define a number of times the digital media asset has been displayed to the user via the one or more GUIs of the one or more open web digital channels. The instructions, when executed by one or more processors, may further cause the one or more processors to push an impression frequency message to an application programming interface (API) of an online based digital media content distribution platform. The impression frequency message may comprise the identifier of the user. The online based digital media content distribution platform may be configured to suppress or allow the digital media asset to be displayed to the user on a GUI of the online based digital media content distribution platform based on the impression frequency message.

In accordance with the above, and with the disclosure herein, the present disclosure includes improvements in computer functionality or improvements to other technologies at least because the disclosure describes that, e.g., a distribution server, the edge computing devices with which the distribution server communicates (e.g., a user computer device), and the underlying computer network upon which the distribution server and the computing device communicate, are each improved where the distribution server is able to suppress digital media assets (e.g., comprising sizable data payloads) from being transmitted across the computer network and displayed or rendered by the edge computing device. For example, the distribution server may track or determine, through merging identifiers of a user using one or more edge devices on one or more open web and/or online platforms in order to determine when to suppress further digital media assets from being transmitted across the network. That is, by suppression of digital media assets, the digital media distribution frequency management methods and system described herein reduce digital media transmitted across digital networks and platforms. This results in fewer messages (e.g., digital media assets) sent across network, whether it may be an internal or an external network. This also results in less compute power and memory use by nodes of the system by not having to process and/or send redundant digital media assets that would otherwise be sent across computer networks.

For similar reasons, the present disclosure relates to improvements to other technologies or technical fields at least because the present disclosure describes or introduces improvements to computing networks, where the digital media distribution frequency management systems and methods, as described herein, improve the overall health of computing networking by reducing digital media across digital networks and platforms, thereby increasing bandwidth and data packet traffic for each given computer and network that would otherwise be involved in the transmission of such digital media assets.

In addition, edge devices (e.g., user computing devices) are further improved by avoiding rendering or displaying redundant digital media assets. That is, an impression frequency message may comprise the identifiers of the users for which to allow and/or suppress digital media assets from being delivered across a network and/or otherwise shown or rendered on a graphical user interface. In this way the impression frequency message can reduce digital media asset dissemination or distribution across one or more computer networks, and therefore reduces resource utilization across multiple devices including the online platforms that would otherwise distribute a digital media asset to a user's device (e.g., user computing device 111c1) that would render the digital media asset 204. This also further reduces utilization of the underlying computer network itself given that fewer digital media assets (comprising graphics, text, and other payload data) would need to be transferred via the network.

In addition, the present disclosure includes specific features other than what is well-understood, routine, conventional activity in the field, or adding unconventional steps that confine the claim to a particular useful application, e.g., digital media distribution frequency management systems and methods for reducing digital media across digital networks and platforms, as further described herein.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein:

FIG. 6 illustrates example computing instructions or code for determining an identifier of a user, in accordance with various aspects herein.

The Figures depict preferred aspects for purposes of illustration only. Alternative aspects of the systems and methods illustrated herein may be employed without departing from the principles of the invention described herein.

DETAILED DESCRIPTION OF THE INVENTION

Figure 1:
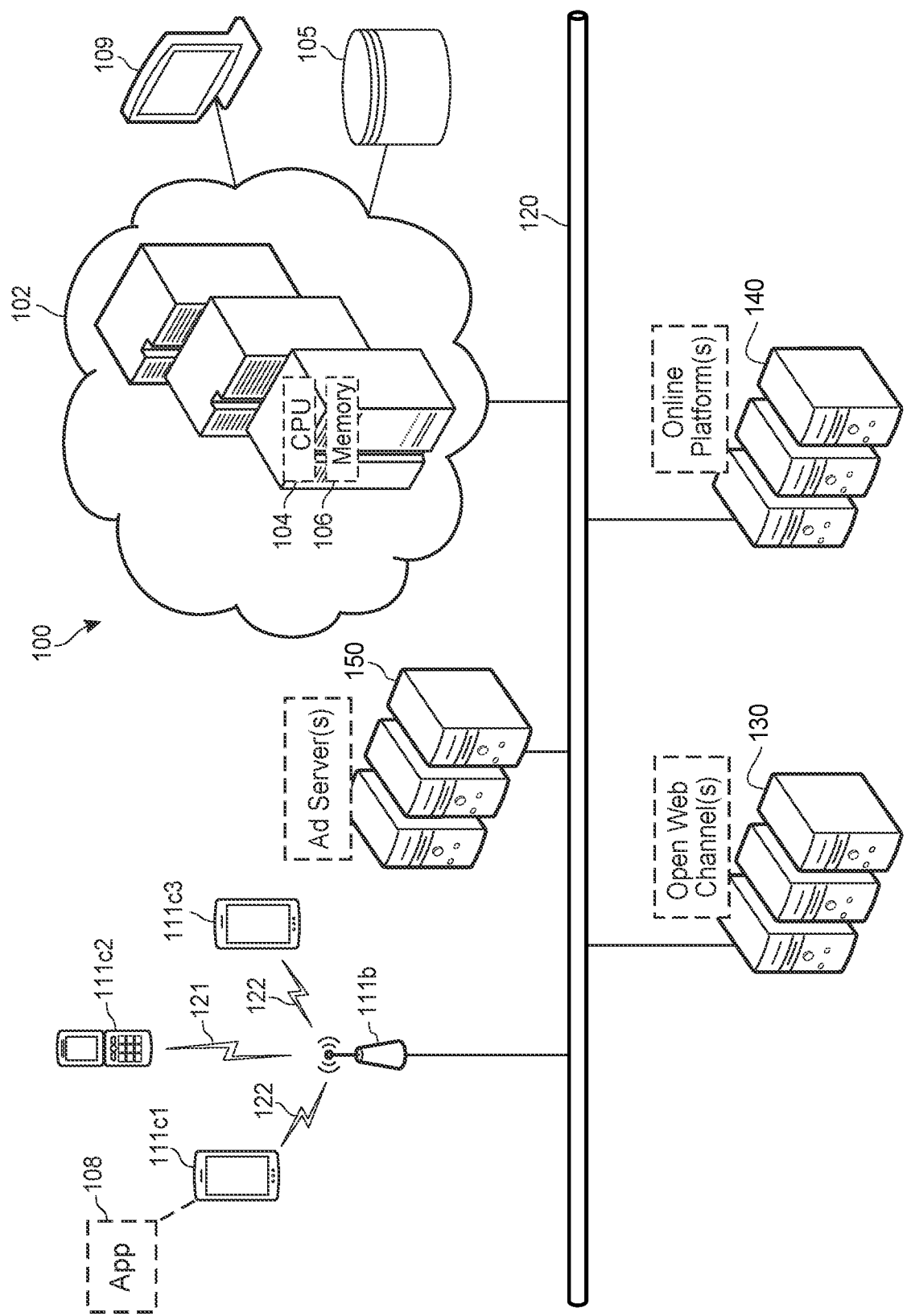
FIG. 1 illustrates an example digital media distribution frequency management system configured to reduce digital media across digital networks and platforms, in accordance with various aspects disclosed herein.

FIG. 1 illustrates an example digital media distribution frequency management system 100 configured to reduce digital media across digital networks and platforms, in accordance with various aspects disclosed herein.

In the example aspect of FIG. 1, distribution frequency management system 100 includes server(s) 102, which may comprise one or more computer servers. In various aspects server(s) 102 comprise multiple servers, which may comprise multiple, redundant, or replicated servers as part of a server farm. In still further aspects, server(s) 102 may be implemented as cloud-based servers, such as a cloud-based computing platform. For example, distribution server(s) 102 may be any one or more cloud-based platform(s) such as MICROSOFT AZURE, GOOGLE CLOUD, AMAZON AWS, or the like. Server(s) 102 may include one or more processor(s) 104 as well as one or more computer memories 106. In various aspects, server(s) 102 may be referred to herein as "distribution server(s)."

Memory 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

MemorieMemories106 may store an operating system (OS) (e.g., Microsoft Windows, Linux, UNIX, etc.) capable of facilitating the functionalities, apps, methods, or other software as discussed herein. Memory 106 may also store computing instructions for implementing any one or more of the digital media distribution frequency management methods as described herein, including as described herein with respect to FIGS. 3-5. Additionally, or alternatively, digital media assets (e.g., digital adds), user data, impression count data, impression frequency data or messages, other any other data or information, as described herein, may also be stored in memory 106 and/or database 105. Database 105 is accessible or otherwise communicatively coupled to distribution server(s) 102. In addition, memories 106 may also store machine readable instructions, including any of one or more application(s) (e.g., an application as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. The computing instructions or applications as described herein may be executed by the processor(s) 104.

The processor(s) 104 may be connected to the memories 106 via a computer bus responsible for transmitting electronic data, data packets, or otherwise electronic signals to and from the processor(s) 104 and memories 106 in order to implement or perform the machine readable instructions, methods, processes, elements or limitations, as illustrated, depicted, or described for the various flowcharts, illustrations, diagrams, figures, and/or other disclosure herein.

Processor(s) 104 may interface with memory 106 via the computer bus to execute an operating system (OS). Processor(s) 104 may also interface with the memory 106 via the computer bus to create, read, update, delete, or otherwise access or interact with the data stored in memories 106 and/or the database 105 (e.g., a relational database, such as Oracle, DB2, MySQL, or a NoSQL based database, such as MongoDB). The data stored in memories 106 and/or database 105 may include all or part of any of the data or information described herein, including, for example, digital media assets (e.g., digital media asset 204) and/or other assets or data regarding users, impress counts, impression IDs, or the like, or as otherwise described herein.

Distribution server(s) 102 may further include a communication component configured to communicate (e.g., send and receive) data via one or more external/network port(s) to one or more networks or local terminals, such as computer network 120 and/or terminal 109 (for rendering or visualizing) described herein. For example, in some aspects, distribution server(s) 102 may include a client-server platform technology such as ASP.NET, Java J2EE, Ruby on Rails, Node.js, a web service or online API, responsive for receiving and responding to electronic requests. The distribution server(s) 102 may implement the client-server platform technology that may interact, via the computer bus, with the memory 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein.

In various aspects, the distribution server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some aspects, computer network 120 may comprise a private network or local area network (LAN). Additionally, or alternatively, computer network 120 may comprise a public network such as the Internet.

Distribution server(s) 102 may further include or implement an operator interface configured to present information to an administrator or operator and/or receive inputs from the administrator or operator. As shown in FIG. 1, an operator interface may provide a display screen (e.g., via terminal 109). Distribution server(s) 102 may also provide I/O components (e.g., ports, capacitive or resistive touch sensitive input panels, keys, buttons, lights, LEDs), which may be directly accessible via, or attached to, distribution server(s) 102, or may be indirectly accessible via or attached to terminal 109. According to some aspects, an administrator or operator may access the server 102 via terminal 109 to review information, make changes, add or modify digital media assets, configure impression count and/or frequency, and/or perform other functions as described herein.

As described herein, in some aspects, distribution server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the model(s), such as AI models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 1, distribution server(s) 102 are communicatively connected, via computer network 120 to the one or more user computing devices 111c1-111c3 via base stations 111b. In some aspects, base stations 111b may comprise cellular base stations, such as cell towers, communicating to the one or more user computing devices 111c1-111c3 via wireless communications 121 based on any one or more of various mobile phone standards, including NMT, GSM, CDMA, UMMTS, LTE, 5G, or the like. Additionally, or alternatively, base stations 111*b* may comprise routers, wireless switches, or other such wireless connection points communicating to the one or more user computing devices 111*c*1-111*c*3 via wireless communications 122 based on any one or more of various wireless standards, including by non-limiting example, IEEE 802.11a/b/c/g (WIFI), the BLUETOOTH standard, or the like.

Any of the one or more user computing devices 111*c*1-111*c*3 may comprise mobile devices and/or client devices for accessing and/or communications with distribution server(s) 102. Such mobile devices may comprise one or more mobile processor(s) and/or an imaging device for capturing images. In various aspects, user computing devices 111*c*1-111*c*3 may comprise a mobile phone (e.g., a cellular phone), a tablet device, a personal data assistance (PDA), or the like, including, by non-limiting example, an APPLE iPhone or iPad device or an ANDROID based mobile phone or tablet.

In various aspects, the one or more user computing devices 111*c*1-111*c*3 may implement or execute an operating system (OS) or mobile platform such as APPLE iOS and/or ANDROID operation system. Any of the one or more user computing devices 111*c*1-111*c*3 may comprise one or more processors and/or one or more memories for storing, implementing, or executing computing instructions or code, e.g., a mobile application, as described in various aspects herein. As shown in FIG. 1, application (app) 108 and/or an application as described herein, or at least portions thereof, may also be stored locally on a memory of a user computing device (e.g., user computing device 111*c*1).

User computing devices 111*c*1-111*c*3 may each comprise a wireless transceiver to receive and transmit wireless communications 121 and/or 122 to and from base stations 111*b*. In various aspects, digital media assets (e.g., digital media asset 204) may be transmitted via computer network 120 to user computing devices 111*c*1-111*c*3, open web channel(s) 130 and/or platforms(s) 140 for distribution, sharing, suppressing, and/or allowing digital media assets, as described herein.

Open web channel(s) 130 may comprise one or more servers hosting a website or webpage accessible on the Internet, where such website or webpage may comprise digital resources or online content such as provided by websites for the New York TIMES, USA TODAY, or similar digital, public or accessible online resource that may be openly accessed without a user account or user page, or otherwise user-based platform with which a user can interact with. Additionally, or alternatively, open web channel(s) 130 may comprise an impression ID aggregator, such as, by way of non-limiting example, as provided by the TTD platform. In various aspects, the open web channel(s) 130 may track, store, detect, or otherwise determine a set of impression identifiers (IDs) of a digital media asset (e.g., digital media asset 204) as displayed on one or more GUIs, such as a GUI of any one or more of computing devices 111*c*1-111*c*3. That is, the digital media assets may be provided from the open web channel(s) 130 for display on the GUI(s). In various aspects, the set of impression IDs may be determined by server(s) 102, such as via download or retrieval from open web channel(s) 130. Still further, in various aspects an identifier of a user may be determined as well as an impression count of the user based on the set of impression IDs and an open web ID of the user. The impression count may define a number of times the digital media asset has been displayed to the user via the GUI(s) of the one or more open web digital channels, e.g., the digital media assets as provided from the one open web channel(s) 130 to the GUI(s) of any one or more of computing devices 111*c*1-111*c*3.

With further reference to FIG. 1, online platform(s) 140 may comprise one or more online based digital media content distribution platforms, which may comprise one or more servers. Online platform(s) 140 may comprise media based platforms such as the FACEBOOK platform and/or YOUTUBE platform, or the like, where users may interact with media, such as digital media assets, images, videos, or the like. Online platform(s) 140 are configurable to suppress or allow the digital media asset to be displayed to the user on a GUI of the online based digital media content distribution platform based on an impression frequency message. A GUI of the online based digital media content distribution platform may comprise an application (app) as provided by a given digital media content distribution platform, such as the FACEBOOK app or website and/or the YOUTUBE app or website.

With still further reference to FIG. 1, Ad Server(s) 150 may comprise one or more online ad server based platforms, which may comprise one or more servers. Ad Server(s) 150 150 may comprise ad or media based platforms such as the KEVEL platform, OPENX platform, or the like. As for online platform(s) 140, Ad Server(s) 150 are configurable to suppress or allow the digital media asset to be displayed to the user on a GUI. Ad Server(s), however, may execute code, algorithms, or functionally, as describe herein, the same or similar manner as server(s) 102, where such code, algorithms, or functionality may be uploaded or otherwise provided to Ad Server(s) 150 from server(s) 102 to allow for similar or same execution. Ad Server(s) 150 are further described herein with respect to FIGS. 7A and 7B. Server(s) 102, implementing computing instructions stored in memory 106 may reduce digital media across digital networks and platforms (e.g., such as network 120 or subnetworks thereof) by communications with open web channel(s) 130 and online platform(s) 140. For example, server(s) 102, implementing computing instructions stored in memory 106 may push an impression frequency message to an application programming interface (API) of an online based digital media content distribution platform (e.g., online platform(s) 140), where the impression frequency message includes the identifier of the user. The impression frequency message may indicate to allow or suppress digital media assets from being display to a user on a GUI or app as provided by the digital media content distribution platform (e.g., online platform(s) 140).

Figure 2:
FIG. 2 illustrates an example graphic user interface as rendered on a display screen of a user computing device, in accordance with various aspects disclosed herein.

FIG. 2 illustrates an example graphic user interface as rendered on a display screen 200 of a user computing device (e.g., user computing device 111*c*1), in accordance with various aspects disclosed herein. For example, as shown in the example of FIG. 2, graphic user interface 202 may be implemented or rendered via an app executing on user computing device 111*c*1. For example, as shown in the example of FIG. 2, graphic user interface 202 may be implemented or rendered via a native app executing on user computing device 111*c*1. In the example of FIG. 2, user computing device 111*c*1 is a user computer device as described for FIG. 1, e.g., where 111*c*1 is illustrated as an APPLE iPhone that implements the APPLE iOS operating system and that has display screen 200. User computing device 111*c*1 may execute one or more native applications (apps) on its operating system, including, for example, an app (e.g., app 108) as described herein. Such native apps may be implemented or coded (e.g., as computing instructions) in a computing language (e.g., SWIFT) executable by the user computing device operating system (e.g., APPLE iOS) by the processor of user computing device 111c1. In various aspects, the app (e.g., an app 108) executing on a mobile devices, such as user computing device 111c1, may be referred to as a distribution app, designed to display content to the user, including digital media assets (e.g., digital media asset 204), and/or other information, data, or images as described herein. In various aspects, the distribution app may comprise an app of an online platform (e.g., a platform app of an online platform 140) or of an open web channel (e.g., an open web channel app of an open web channel 130).

Additionally, or alternatively, graphic user interface 202 may be implemented or rendered via a web interface, such as via a web browser application, e.g., SAFARI and/or CHROME based web browsers, browser apps, and/or other such web browser or the like. In such aspects, the web browser would return HTML code provided by, or otherwise associated with, the online platform 140 and/or open web channel 130.

Digital media assets may comprise images, graphics, text, and/or audio configured for display on or via open web channel(s) 130 and/or online platform(s) 140. Digital media assets may also be referred to as "digital creatives." Digital media asset 204 is an example digital media asset comprising a digital advertisement (ad). In the example of FIG. 2, digital media asset 204 comprises a digital ad targeted to a target audience (e.g., fathers or "dads") of children who are toddlers (e.g., between ages 1-3). Digital media asset 204 comprises graphics and text pertaining to the target audience (e.g., fathers) and relating to a product for the target audience (e.g., diapers for toddlers). In the example of FIG. 2, digital media asset 204 may be displayed via an app (e.g., app 108) or a website, such as an app or website of an online platform (e.g., a platform app of an online platform 140) or of an open web channel (e.g., an open web channel app of an open web channel 130). It is to be understood that digital media asset 204 is provided as an example and that additional and/or different digital media assets (e.g., digital ads), targeting additional and/or different target audiences may be used, implemented, or distributed as described herein.

With further reference to FIG. 2, in some aspects, a digital media asset may comprise a product recommendation. Alternatively, a product recommendation may be displayed separately (but part of GUI 202) along with digital media asset. For example, a product recommendation (e.g., product recommendation 222) may be for a manufactured product. For example, as shown in FIG. 2, graphic user interface 202 recommends a product (e.g., manufactured product 224r (e.g., absorbent article size 2)), which may be based on the target audience of digital media asset 204.

Graphic user interface 202 may further include a selectable user interface (UI) button 222s to allow the user to select for purchase or shipment the corresponding product (e.g., manufactured product 222r). In some aspects, selection of selectable UI button 222s may cause the recommended product(s) to be shipped to the user and/or may notify a third party that the individual is interested in the product(s). For example, either user computing device 111c1 and/or distribution server(s) 102 may initiate the manufactured product 222r (e.g., absorbent article size 2) for shipment to the user. In such aspects, the product may be packaged and shipped to the user.

Degree 1 Implementation

Figure 3:
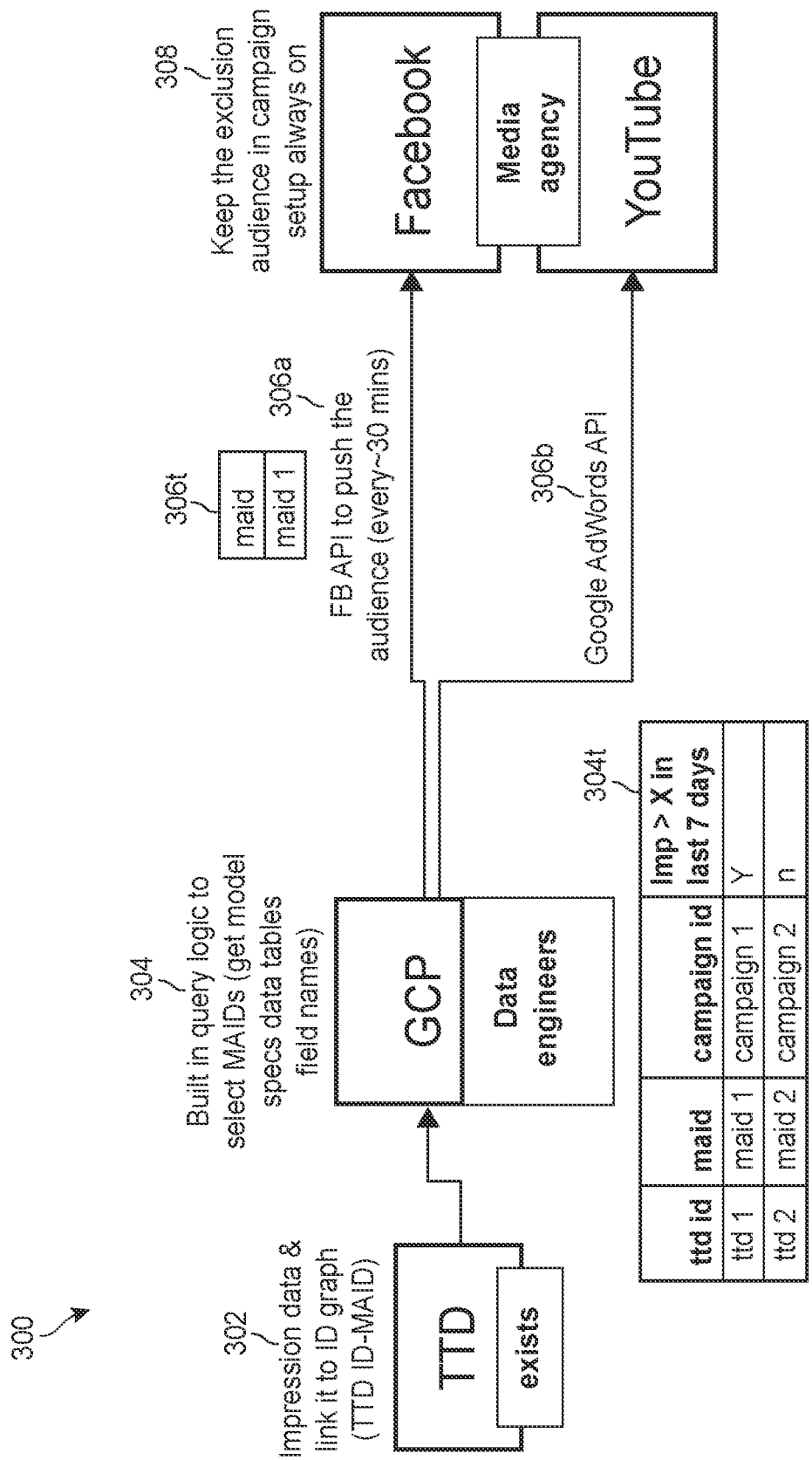
FIG. 3 illustrates an example digital media distribution frequency management method for reducing digital media across digital networks and platforms, in accordance with various aspects disclosed herein.

FIG. 3 illustrates an example digital media distribution frequency management method 300 for reducing digital media across digital networks and platforms, in accordance with various aspects disclosed herein. Digital media distribution frequency management method 300 implements an identifier approach (e.g., a first degree approach) for reducing digital media across digital networks and platforms. Digital media distribution frequency management method 300 illustrates a flowchart or algorithm that may be implemented as computing instructions executable or implementable on server(s) 102 via processor(s) 104 and that may be stored in memory 106.

As shown for FIG. 3, at block 302, digital media distribution frequency management method 300 comprises determining a set of impression identifiers (IDs) of a digital media asset as displayed on one or more graphic user interfaces (GUIs) of one or more open web digital channels. The digital media asset or digital creative may have been previously displayed on graphical areas of a web page or a mobile device (e.g., mobile app) of an open web channel. Additionally, the set of impression IDs may comprise information determined from an impression ID aggregator, such as the TTD, which may provide impression IDs for how many times a digital media asset has been displayed on a given open web channel. Examples of open web channels (e.g., open web channels 130) include the New York Times webpage, the Wall Street Journal webpage, a sports website (e.g., ESPN website), gaming apps, and the like.

The open web channels 130 may provide tracking of users (e.g., by web cookies or device IDs of a given device, such as an IPHONE device ID, etc.), where such information is provided back to an impression ID aggregator (e.g., TTD). In some aspects, the impression IDs or otherwise impression data may comprise an ID graph linking impression IDs to mobile advertising identifier (MAID) or other identifiers, for purposes of achieving higher matching or identification of user. Open web channels 130 may provide this data to distribution server(s) 102 for analysis and determination as described herein.

In some aspects, the set of impression IDs comprise impressions of the digital media asset as displayed on one or more GUIs, or otherwise tracked by open web channels 130, downloaded by servers 102, or otherwise provided to distribution servers 102, for example, within a given time period (e.g., 30 minutes, 1 day, 7 days, or other time period). The set of impression IDs may correspond to different digital media asset campaigns, such as campaign 1, campaign 2, etc. A digital media asset campaign may comprise a period of time and/or platform for a given target audience for which to provide or show a digital media asset. For example, a campaign (e.g., such as campaign 1) may relate to showing digital media asset 204 to fathers on an online platform 140 (e.g., the FACEBOOK platform) for a period of 1 month. It is to be understood that additional and/or different campaigns are also contemplated, such as campaigns for other target audiences (e.g., mothers, teenagers, etc.) and/or for other or different time periods (e.g., 1 day, 1 week, several months, a year, etc.).

At block 304, digital media distribution frequency management method 300 further comprises determining an identifier of a user. In various aspects, the identifier may comprise a mobile advertising identifier (MAID), which is a unique pseudo-anonymous identifier tied to a mobile phone of a user (and thus may be used to uniquely identify the user). For example, both the APPLE IOS operating system and the GOOGLE ANDROID operating system provide unique identifiers for underlying devices that enable data to be pseudo-anonymously be tied back to the mobile device from where such data was collected. Such identifiers are known as mobile advertising identifiers, mobile ad IDs, or simply MAIDs. The APPLE IOS operating system implementation of MAID named the "Identifier For Advertisers" (IDFA). The IDFA consists of 32 hyphen-separated characters, e.g., "918F1D4F-D195-4A8B-AF47-44683FE11DB9." The GOOGLE ANDROID operating system implementation of MAID is named the "Advertising Identifier" (Ad Id). Like the IDFA, it consists of 32 hyphen-separated characters, e.g., "3f097372-f01e-4b64-984c-395ae5828ee6.

Additionally, or alternatively, other or additional identifiers (including one or multiple identifiers) may be used to identify a user. For example, the identifier of the user may comprise one or more of a MAID, a hashed identifier of the user (e.g., a hashed email), an email address of the user, a name of the user, a surname of the user, a postal address of the user, and/or a phone number of the user. In some aspects, different and/or additional identifiers may be used based on geography. For example, hashed emails, hashed phone numbers, and MAIDs may be utilized to identify users (as identifiers) in North America (NA) because such information tends to be readily available in that geography. Use of multiple identifiers tends to increase match rates or percentages between impression data and the target audiences for reducing digital media across digital networks and platforms as described herein.

Still further, at block 304, digital media distribution frequency management method 300 further comprises determining an impression count of the user based on the set of impression IDs and an open web ID of the user. As shown in the example of FIG. 3, various identifiers are shown as determined or mapped in table 304t. Table 304t may be an in memory table, such as s a database table or relational database tables, or otherwise data or data structure, e.g., stored in database 105 and/or computer memories 106. Specifically, in the example, the identifier of the user is a MAID identifier (e.g., maid1 for a first user and maid2 for a second user). In the same example of table 304t, an open web ID is shown as a TTD identifier (e.g., ttd1 for the first user and maid2 for the second user). The open web ID and the identifier are mapped or otherwise associated to identify a given user (e.g., first user and/or second user).

Once a user is identified (e.g., based on the open web ID and/or identifier of the user) an impression count may be determined where the impression count defines a number of times a digital media asset (e.g., digital media asset 204) has been displayed to the user via the one or more GUIs of the one or more open web digital channels. In the example of FIG. 3, the digital media asset 204 has been shown to the first user for campaign 1 (e.g., a campaign regarding offering diapers to fathers for a 30 day period, as shown for FIG. 2). A different campaign (e.g., campaign 2) was shown to the second user.

Table 306t may track, or may be used to determine, the impression count e.g., whether or not a user has been exposed to a given digital media asset (e.g., digital media asset 204) within a given period. In the example of FIG. 3, table 306t indicates a Boolean value that the first user has been exposed to the related digital media asset (e.g., digital asset 204) greater than a certain number of times (e.g., "x" time, such as 14 times) within the past 7 days. It is to be understood, however, that different numbers of times and/or days (or time periods) may also be used when determining the impression count or otherwise the Boolean value. In addition, it is to be understood that other Boolean values may be used. In the example of FIG. 3, "Y" for "yes" and "N" for no is used to indicate whether a user has been exposed or shown a number of digital media assets above the impression count or threshold. Although other values such as "1" and "0", "True" or "False," may be used respectively, any of which may be stored in memory 106 to track the users exposure and/or impression count of a digital media asset (e.g., digital media asset 204).

At block 306, digital media distribution frequency management method 300 further comprises pushing an impression frequency message to an application programming interface (API) of an online based digital media content distribution platform (e.g., online platform(s) 140). The impression frequency message comprises one or more identifiers of respective user(s), such as an identifier (e.g., MAID) of a given user. In the example of FIG. 3, the identifier of the user in a MAID (e.g., maid 1 of the first user). It is to be understood that pushing an impression frequency message may refer, additionally or alternatively, to a file upload, such as a manual or automatic file upload, to an online based digital media content distribution platform (e.g., online platform(s) 140). The impression frequency message may be transmitted over computer network 120 and formatted in JavaScript Object Notation (JSON) format or a similar data transmission format.

In the example of FIG. 3, the impression frequency message is pushed to respective APIs of online platforms 140, which comprise the FB API of the FACEBOOK platform and the GOOGLE ADWORDS API of the YOUTUBE platform. It is to be understood, however, that additional or different media agencies may also receive the pushed impression frequency message.

In addition, as indicated in the example of FIG. 3, the impression frequency message may be pushed based on a time period (e.g., every 30 minutes). That is, a digital media (e.g., digital media asset 204) asset may be suppressed or allowed to be displayed based on a push frequency (e.g., push the information to the FB API every 30 minutes) defining when to push the impression frequency message to the API. It is to be understood that additional or different push time periods may be used.

At block 308, the online based digital media content distribution platform (e.g., online platforms 140) is configured to suppress or allow the digital media asset (e.g., digital media asset 204) to be displayed to the user on a GUI (e.g., GUI 202) of the online based digital media content distribution platform (e.g., one of online platform 140) based on the impression frequency message. It is to be understood that the digital media content distribution platform may be used in an offline capacity, i.e., to use postal sampling campaign frequencies to determine whether to suppress or allow postal media assets. In the example of FIG. 3, the impression frequency message may comprise the identifiers of the users for which to allow and/or suppress digital media assets from being delivered across a network (e.g., computer network 120) and/or otherwise shown or rendered on a GUI (e.g., GUI 202) as described herein for FIG. 2. In this way the impression frequency message reduces digital media asset dissemination or distribution across the computer network 120, and therefore reduces resource utilization across multiple devices including the online platforms 140 that would otherwise distribute the digital media asset 204, the user's device (e.g., user computing device 111c1) that would render the digital media asset 204, and the underlying computer network itself given that fewer digital media assets (comprising graphics, text, and other payload data) would need to be transferred via the network itself.

In some aspects, the impression frequency message may comprise an indication to suppress the digital media asset (e.g., digital media asset 204) from being displayed when the impression count exceeds or is equal to an impression frequency threshold. In the example of FIG. 3, because the first user has exceeded the impression frequency threshold of 7, then the impression frequency threshold may indicate to the online platforms 140 (e.g., FACEBOOK and YOU-TUBE platforms) that the digital media asset 204 should not be shown (again) to the first user.

In various aspects, when the impression frequency message comprises a suppression based indication (e.g., when the digital media asset is to be suppressed from being displayed), the digital media asset may be suppressed from being transmitted across a computer network to a computing device of the user. Additionally, or alternatively, in some aspects, when the digital media asset is suppressed, an online based asset different from the digital media asset may be transmitted and displayed on the GUI, e.g., by one of the online platforms 140 and/or the distribution servers 102. The different digital media asset may be a digital media asset of the same company or brand or of a different company or brand for a similar or different product or service.

In various aspects, the online based digital media content distribution platform (e.g., online platforms 140) is configured to allow the digital media asset (e.g., digital media asset 204) to be displayed to the user on a GUI (e.g., GUI 202) of the online based digital media content distribution platform (e.g., one of online platform 140) based on the impression frequency message. In such aspects, the digital media asset (e.g., digital media asset 204) is transmitted across a computer network (e.g., network 120) to a computing device (e.g., user computing device 111c1) of the user when the digital media asset is allowed to be displayed on the computing device.

For example, the impression frequency message may comprise an indication to allow the digital media asset (e.g., digital media asset 204) to be displayed when the impression count is below an impression frequency threshold. In the example of FIG. 3, the digital media asset (e.g., digital media asset 204) may be displayed to the second user because the second user because the second user was not shown the digital media asset as part of campaign 2 thereby exceeding the impression frequency threshold in the given number of days (e.g., 7 days).

In some aspects, the impression frequency message may comprise an indication to allow the digital media asset to be displayed when the identifier of the user is identified as an exclusion. This may be where a user is identified as part of an exclusion audience. In such cases, the digital media asset (e.g., digital media asset 204) may be transmitted and displayed to the user even if the user's impression frequency threshold has been exceeded. In the example of FIG. 3, if the first user (e.g., with MAID 1) were identified as an exclusion, the digital media asset (e.g., digital media asset 204) may nonetheless be displayed even though the first user exceeded the related impression frequency threshold.

Degree 2 Implementation

Figure 4:
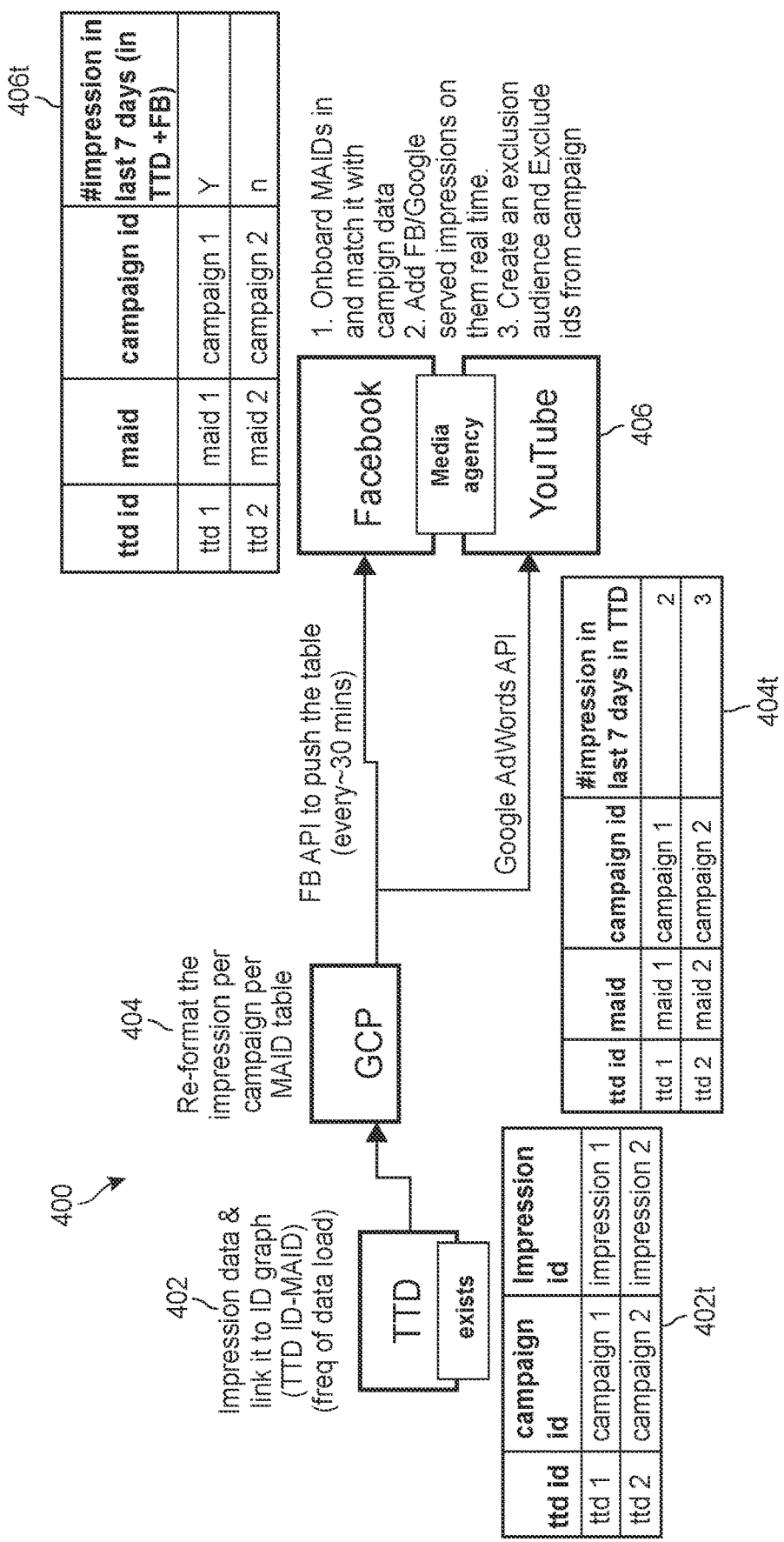
FIG. 4 illustrates a second example of example digital media distribution frequency management method for reducing digital media across digital networks and platforms, in accordance with various aspects disclosed herein.

FIG. 4 illustrates a second example of example digital media distribution frequency management method 400 for reducing digital media across digital networks and platforms, in accordance with various aspects disclosed herein. Digital media distribution frequency management method 400 implements an identifier approach (e.g., a second degree approach) for reducing digital media across digital networks and platforms. In the second degree approach, in addition or in alternative to sending a Boolean indication to allow or suppress a digital media asset (as for the first degree approach as described above for FIG. 3), an actual impression count is provided with the impression frequency message to the online platform(s) 140 (e.g., the FACEBOOK platform or API). The impression count can then be merged or otherwise analyzed on-platform, that is merged with counts of the platform or otherwise analyzed by the platform itself, to determine whether or not to allow or suppress a digital media asset (e.g., digital media asset 204).

As shown for FIG. 4, digital media distribution frequency management method 400 illustrates a flowchart or algorithm that may be implemented as computing instructions executable or implementable on server(s) 102 via processor(s) 104 and that may be stored in memory 106. In some aspects, digital media distribution frequency management method 400 may be performed in addition to digital media distribution frequency management method 300. In other aspects, digital media distribution frequency management method 400 is performed separately from digital media distribution frequency management method 300.

As shown for FIG. 4, at block 402, digital media distribution frequency management method 400 comprises determining a set of impression identifiers (IDs) of a digital media asset (e.g., digital media asset 204) as displayed on one or more graphic user interfaces (GUIs) (e.g., GUI 202) of one or more open web digital channels (e.g., open web channel(s) 130). The digital media asset or digital creative may have been previously displayed on graphical areas of a web page or a mobile device (e.g., mobile app) of an open web channel in a same or similar manner as described for FIG. 3 or as elsewhere described herein.

As shown for FIG. 4, various identifiers are shown as determined or mapped in table 402t. Table 402t may be an in memory table, such as s a database table or relational database tables, or otherwise data or data structure, e.g., stored in database 105 and/or computer memories 106. Specifically, in the example of table 402t, an open web ID is shown as a TTD identifier (e.g., ttd1 for the first user and ttd2 for the second user, respectively). The open web ID and the identifier are mapped or otherwise associated with data defining a campaign that a given digital media asset (e.g., digital media asset 204) was transmitted and/or displayed to the user. For example, each of the first user (e.g., associated with identifier ttd1) and the second user (e.g., associated with identifier ttd2). In addition, in the example of table 402t, the table 402t includes data regarding the number of impressions of the digital media asset on a given user. An impression occurs when the digital media asset (e.g., digital media asset 204) is transmitted and/or displayed to the user. For the example of FIG. 4, the first user has an impression ID of 1 (e.g., which may indicate that the first user has received or been displayed the digital asset once) and the second user has an impression ID of 2 (i.e., which may indicate that the second user has received or been displayed the digital asset twice). In various aspects, the impression data of may be limited or incomplete as it may be impression data provided by the open web channels 130 (e.g., the TTD) without all such data, where the data needs to be further merged or reformatted in order to determine complete impression data for a given user (e.g., the first user of the second user). Alternatively, such impression data may be complete, where such data is available entirely from open web channel(s) 130.

At block 404, digital media distribution frequency management method 400 comprises generating an open web identifier table (e.g., open web identifier table 404t) mapping the identifier of the user to the open web ID of the user and the impression count of the user for the digital media asset as displayed to the user. Open web identifier table 404t may be generated based on the information from open web channel(s) 130, which may include the information in table 402t. In various aspects, the open web identifier table (e.g., open web identifier table 404t) may be generated, for example, by executing the code as described for FIG. 6.

In some aspects, generation of the open web identifier table (e.g., open web identifier table 404t) may further include generating additional identifiable information of the user, which may include one or more of: hashed email information of the user, a cookie ID of the user, a name of the user, a surname of the user, a phone number, or a postal address of the user. That is personal identifiable information (PII) such as MAID, cookie ID, name, surname, postal address hashed emails, could be used to generate the of the open web identifier table (e.g., open web identifier table 404t) so as to provide a higher quality match or higher percent match for ID mapping, when a greater number of the user's PII is used to correctly identify the user.

As shown for FIG. 4, further at block 404, digital media distribution frequency management method 400 further comprises adding or updating the impression frequency message to further include or comprise the impression count of the user. For example, as shown for open web identifier table 404t, an impression count may be determined where the impression count defines a number of times a digital media asset (e.g., digital media asset 204) has been displayed to the user via the one or more GUIs of the one or more open web digital channels. In the example of FIG. 4, the digital media asset 204 has been shown to the first user for campaign 1 a total of 2 times (i.e., 2 impressions). Campaign 1 may comprise a campaign regarding offering diapers to fathers for a 30 day period, as shown for FIG. 2.

In this way, table open web identifier table 404t may track, or may be used to determine, the impression count or impressions—that is, to determine whether or not a user has been exposed to a given digital media asset (e.g., digital media asset 204)—within a given period. The number of impressions may be determined by reformatting, mapping, or otherwise determining the impressions on a per user basis across one or more open web channel(s) 130.

In this way, for the first user, the open web ID for the first user (ttd1) and the MAID for the first user (maid 1) may have been mapped to identify the first user's impressions, where these identifiers indicate that the first user has seen campaign 1 (e.g., rendered on a display of a device of the first user) comprising digital media asset (e.g., digital media asset 204) two times (i.e., two impressions) with the last seven days. Similarly, as a second example, for the second user, the open web ID for the second user (ttd2) and the MAID for the second user (maid 2) may have been mapped to identify the second user's impressions, where these identifiers indicate that the second user has seen campaign 2 (e.g., rendered on a display of a device of the second user) comprising a digital media asset 204 three times (i.e., three impressions) with the last seven days.

At block 406, digital media distribution frequency management method 400 further comprises pushing, from server(s) 102, an impression frequency message to an application programming interface (API) of an online based digital media content distribution platform (e.g., online platform(s) 140). The impression frequency message comprises one or more identifiers of respective user(s), such as an identifier (e.g., MAID) of a given user. Digital media distribution frequency management method 400 comprises adding the impression count of the user as part of the impression frequency message.

In the example of FIG. 4, the information of web identifier table 404t is also provided to online platform(s) 140, where such information includes the open web ID, the MAID ID, the campaign, and the number of impressions for each user. It is to be understood that additional or different information may be pushed from server(s) 102 to online platform(s) 140, the FACEBOOK platform and the YOUTUBE platform via the FACEBOOK API and/or the YOUTUBE API, respectively. The impression frequency message may be transmitted from server(s) 102 over network 120 in JavaScript Object Notation (JSON) format or a similar data transmission formation. That is, in the example of FIG. 4, the impression frequency message may be pushed from server(s) 102 to respective APIs of online platforms 140, which comprise the FB API of the FACEBOOK platform and the GOOGLE ADWORDS API of the YOUTUBE platform. It is to be understood, however, that additional or different media agencies may also receive the pushed impression frequency message.

In addition, as indicated in the example of FIG. 4, the impression frequency message may be pushed based on a time period (e.g., every 30 minutes). That is, a digital media (e.g., digital media asset 204) asset may be suppressed or allowed to be displayed based on a push frequency (e.g., push the information to the FB API every 30 minutes) defining when to push, from servers(s) 102, the impression frequency message to the API. It is to be understood that additional or different push time periods may be used.

As shown for FIG. 4, at block 406, when the impression frequency message arrives at the online platform(s) 140, an identifier of the user (e.g., an open web ID such as ttd1) is mapped to a corresponding identifier (e.g., MAID such as maid1) of the user as stored on the online based digital media content distribution platform. The online platforms 140 are configured to determine a mapped impression count based on the impression count as pushed and a platform impression count as stored on the online based digital media content distribution platform (e.g., online platforms 140). The mapping may be on-boarded (received) and determined by online platforms 140 in real-time. The platform impression count defines a number of times the digital media asset has been displayed to the user on one or more GUIs of the online based digital media content distribution platform. For example, a platform impression count may define the number of times a digital media asset (e.g., digital media asset 204) has been displayed on the FACEBOOK platform. A separate platform impression count for a different platform (e.g., the YOUTUBE platform) may define the number of times the same digital media asset (e.g., digital media asset 204) has been displayed on the YOUTUBE platform.

In this way, the impression frequency message, with its counts of the impressions as determined from the open web channel(s) 130 may be combined, added, summed, or otherwise mapped to determine a total impression count for a given user for a given campaign and across several different platforms. The online based digital media content distribution platform (e.g., online platform(s) 140) may be configured to suppress or allow the digital media asset (e.g., digital media asset 204) from being displayed to the user on a GUI (e.g., GUI 202) of the online based digital media content distribution platform (e.g., one of online platform 140) based on the impression frequency message.

In the example, of FIG. 4, the online based digital media content distribution platform (e.g., online platforms 140) is configured to suppress or allow the digital media asset to be displayed to the user on a GUI of the online based digital media content distribution platform based on the mapped impression count.

In the example of FIG. 4, the impression frequency message may comprise the identifiers and the impressions of the users for which to allow and/or suppress digital media assets from being delivered across a network (e.g., computer network 120) and/or otherwise shown or rendered on a GUI (e.g., GUI 202) as described herein for FIG. 2. For example, as shown for table 406t, the online platform has combined or mapped all impressions for each of the first user and the second user. The first user has a total impression count of 6 impressions for campaign 1, indicating that the combined impressions, where a digital media asset (e.g., digital media asset 204) was transmitted and/or displayed to the first user on both on the open web channel and online platform, comprised a total of 6 impressions. Similarly, the second user has a total impression count of 4 impressions for campaign 2, indicating that the combined impressions, where a digital media asset (e.g., digital media asset 204) was transmitted and/or displayed to the second user on both on the open web channel and online platform, comprised a total of 4 impressions.

The digital media asset (e.g., digital media asset 204) may be suppressed or allowed in the same or similar ways or manners as described herein for FIG. 3, which may include not transmitting one or more digital media assets (e.g., digital media asset 204) over one or more computer networks (e.g., computer network 120) to user devices for display and rendering thereon. In the example of FIG. 4, the digital media asset (e.g., digital media asset 204) may be suppressed or allowed based on the mapped impression count (e.g., total or combined impression count), where a user (e.g., the first user) having a mapped compression count above a threshold value (e.g., above 5) may be excluded from receiving the digital media asset 204, and where a user (e.g., the second user) below the a certain threshold value may be allowed to receive the digital media assets In this way the impression frequency message reduces digital media asset dissemination or distribution across the computer network 120, and therefore reduces resource utilization across multiple devices including the online platforms 140 that would otherwise distribute the digital media asset 204, the user's device (e.g., user computing device 111c1) that would render the digital media asset 204, and the underlying computer network itself given that fewer digital media assets (comprising graphics, text, and other payload data) would need to be transferred via the network itself.

Degree 3 Implementation

Figure 5:
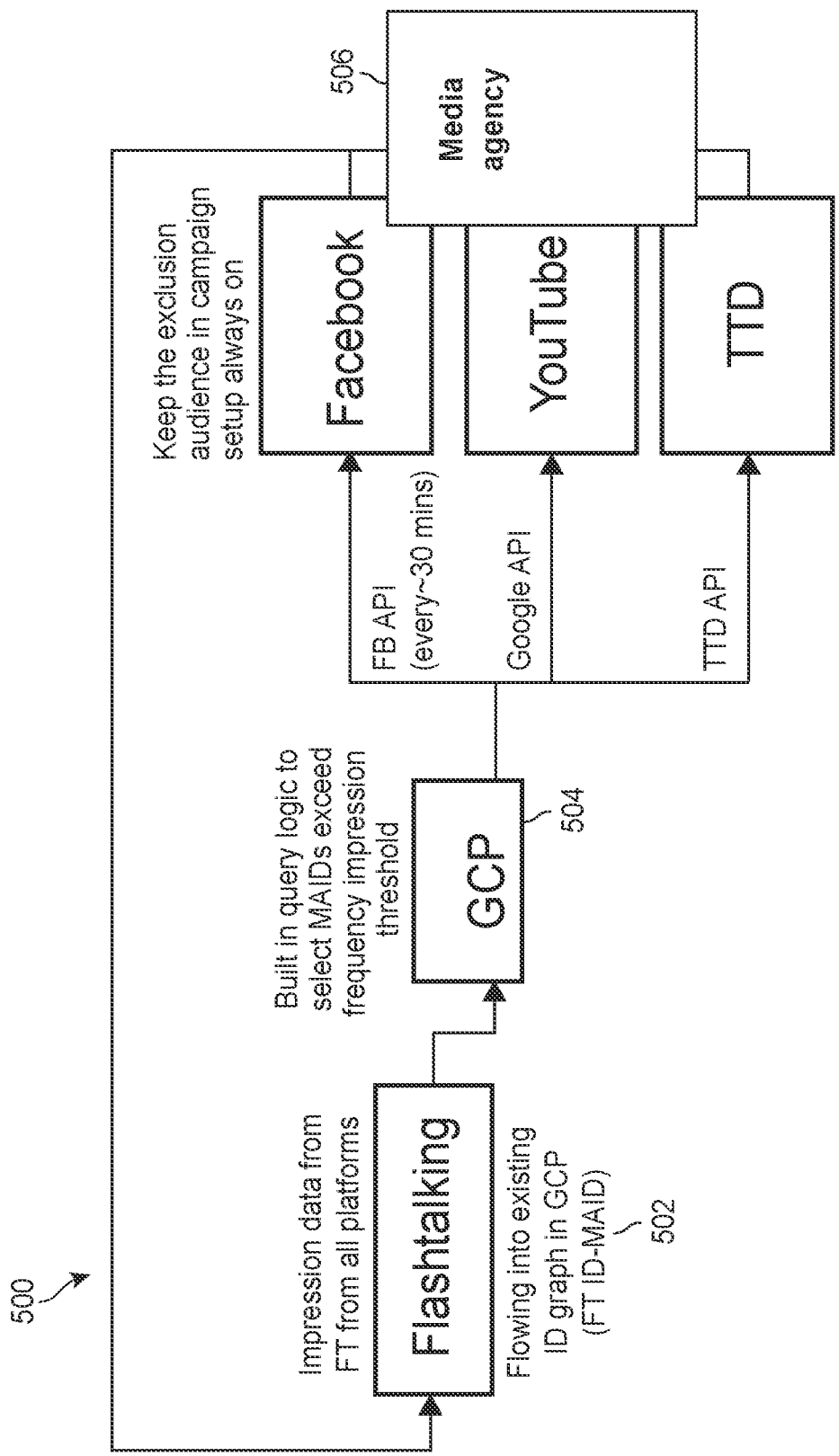
FIG. 5 illustrates a third example of example digital media distribution frequency management method for reducing digital media across digital networks and platforms, in accordance with various aspects disclosed herein.

FIG. 5 illustrates a third example of example digital media distribution frequency management method 500 for reducing digital media across digital networks and platforms, in accordance with various aspects disclosed herein. Digital media distribution frequency management method 500 implements a feedback-based identifier approach (e.g., a third degree approach) for reducing digital media across digital networks and platforms. In the third degree approach, a Boolean and/or impression count may be provided to online platforms 140 to allow or suppress a digital media asset (as for the first degree and/or second degree approaches as described above for FIG. 3 and FIG. 4, respectively). As described for methods 300 and 400 above, the Boolean and/or impression count may be provided with the impression frequency message to the online platform(s) 140 (e.g., the FACEBOOK platform or API). The impression count can then be merged or otherwise analyzed on-platform, that is merged with counts of the platform or otherwise analyzed by the platform itself, to determine whether or not to allow or suppress a digital media asset (e.g., digital media asset 204).

Digital media distribution frequency management method 500 illustrates a flowchart or algorithm that may be implemented as computing instructions executable or implementable on server(s) 102 via processor(s) 104 and that may be stored in memory 106. In some aspects, digital media distribution frequency management method 500 may be performed in addition to digital media distribution frequency management method 300 and/or digital media distribution frequency management method 400. In other aspects, digital media distribution frequency management method 500 is performed separately from either of digital media distribution frequency management method 300 and/or digital media distribution frequency management method 400.

As shown for FIG. 5, at block 502, digital media distribution frequency management method 500 comprises determining a set of impression identifiers (IDs) of a digital media asset (e.g., digital media asset 204) as displayed on one or more graphic user interfaces (GUIs) (e.g., GUI 202) of one or more open web digital channels (e.g., open web channel(s) 130). The digital media asset or digital creative may have been previously displayed on graphical areas of a web page or a mobile device (e.g., mobile app) of an open web channel in a same or similar manner as described for FIG. 3, FIG. 4, or as elsewhere described herein.

As shown for FIG. 5, impression data and related IDs may be collected from all platforms and stored as data, such as in a table (not shown) at either servers 102(s) or a cloud based system, such as the FLASHTALKING cloud platform. The table or data may be an in memory table, such as s a database table or relational database tables, or otherwise data or data structure, e.g., stored in database 105 and/or computer memories 106. Specifically, in the example of FIG. 5, impression data may be provided from online platforms 140(s) and/or open web channel(s) 130, such as from the FACEBOOK platform, the YOUTUBE platform, and/or the TTD platform. That is, servers 102 and/or cloud platforms (e.g., such as the FLASHTALKING cloud platform) may receive one or more platform impression IDs from one or more online based digital media content distribution platforms (e.g., online platforms 140).

The set of impression IDs may comprise the platform impression IDs and further define the digital asset (e.g., digital media asset 204) as displayed on one or more GUIs of one or more online based digital media content distribution platforms (e.g., online platforms 140), such as the FACEBOOK platform or the GOOGLE platform. The impression count may define the number of times the digital media asset (e.g., digital media asset 204) has been displayed to the user on the one or more GUIs of the one or more online based digital media content distribution platforms (e.g., digital media asset 204).

The impression data provided to servers 102 or a cloud platform, at block 502, may comprise identifier data (e.g., such as open web ID data, MAID data, or other PII data as described herein), campaign data, impression data, impression count data, or any other such data as described herein. In some aspects, the impression data is incomplete and is mapped after it arrives as servers 102 and/or the cloud platform. For example, identifier data may be mapped or otherwise associated with data defining a campaign that a given digital media asset (e.g., digital media asset 204) was transmitted and/or displayed to the user. For example, each of the first user (e.g., associated with identifier ttd1) and the second user (e.g., associated with identifier ttd2). In addition, data regarding the number of impressions of the digital media asset displayed to a given user may also be mapped. In any event, the impression data as received from online platforms 140 and/or open web channels 130 is provided to servers 102 and/or the cloud platform in a feedback loop or in a continuous, or time-based, manner. In this way, feedback, from the online platforms 140 and/or open web channels 130 in the form of impression data and identifiers of users are continuously provided in order to track impressions for respective users.

At block 504, digital media distribution frequency management method 500 may comprise determining one or more identifiers of respective users and respective impression counts of the users for the digital media asset (e.g., digital media asset 204) as displayed to the users. Such information may be determined based on the impression data received at block 502 from online platforms 140 and/or open web channels 130.

As shown for FIG. 5, further at block 504, digital media distribution frequency management method 500 further comprises the impression frequency count of respective users and further determine whether such frequency counts exceeds respective frequency impression threshold(s). This may comprise determining, with a build query (e.g., database query such as described herein for FIG. 6) for each user, whether a user specific impression count, as determined from the impression data, exceeds a given threshold value (e.g., 5 total impressions). The impression count defines a number of times a digital media asset (e.g., digital media asset 204) has been displayed to the user via the one or more GUIs of the one or more open web digital channels. For example, a first user, may have seen campaign 1 (e.g., rendered on a display of a device of the first user) comprising digital media asset (e.g., digital media asset 204) two times (i.e., two impressions) with the last seven days. Similarly, as a second example, for the second user, the second user may have seen campaign 2 (e.g., rendered on a display of a device of the second user) comprising a digital media asset 204 three times (i.e., three impressions) with the last seven days.

At block 506, digital media distribution frequency management method 500 further comprises pushing, from server(s) 102, an impression frequency message to an application programming interface (API) of an online based digital media content distribution platform (e.g., online platform(s) 140. In various aspects, the impression frequency message may comprise a second impression frequency message to open web channels 130. That is, a second impression frequency message may be pushed to a second application programming interface (API) of an open web digital channel (e.g., TTD platform). The open web digital channel (e.g., open web channels 130) may be configured to suppress or allow the digital media asset to be displayed to the user on a GUI of the open web digital channel (e.g., the New York Times) based on the second impression frequency message.

The impression frequency message may comprise one or more identifiers of respective user(s), such as an identifier (e.g., MAID) of a given user. Digital media distribution frequency management method 500 may also include the impression count of the user(s) as part of the impression frequency message. The impression frequency message may be transmitted from server(s) 102 over network 120 in JavaScript Object Notation (JSON) format or a similar data transmission formation. That is, in the example of FIG. 5, the impression frequency message may be pushed from server(s) 102 to respective APIs of online platforms 140, which comprise the FB API of the FACEBOOK platform and the GOOGLE ADWORDS API of the YOUTUBE platform. In addition, in the aspect of FIG. 5, the impression frequency message, or otherwise impression data, may also be pushed to open web channels 130 (e.g., TTD). It is to be understood, however, that additional or different media agencies may also receive the pushed impression frequency message.

In addition, as indicated in the example of FIG. 5, the impression frequency message may be pushed based on a time period (e.g., every 30 minutes). That is, a digital media (e.g., digital media asset 204) asset may be suppressed or allowed to be displayed based on a push frequency (e.g., push the information to the FB API every 30 minutes) defining when to push, from servers(s) 102, the impression frequency message to the API. It is to be understood that additional or different push time periods may be used.

At block 506, when the impression frequency message arrives at the online platform(s) 140 and/or open web channels 130, an identifier of the user (e.g., an open web ID such as ttd1) is mapped or determined for a corresponding identifier (e.g., MAID such as maid1) of the user as stored on the online based digital media content distribution platform. The online platforms 140 are configured to determine a mapped impression count based on the impression count as pushed and a platform impression count as stored on the online based digital media content distribution platform (e.g., online platforms 140). The mapping may be onboarded (received) and determined by online platforms 140 in real-time. The platform impression count defines a number of times the digital media asset has been displayed to the user on one or more GUIs of the online based digital media content distribution platform. For example, a platform impression count may define the number of times a digital media asset (e.g., digital media asset 204) has been displayed on the FACEBOOK platform. A separate platform impression count for a different platform (e.g., the YOUTUBE platform) may define the number of times the same digital media asset (e.g., digital media asset 204) has been displayed on the YOUTUBE platform. Still further, the open web channels 130 may have an open web count defining the number of times the same digital media asset (e.g., digital media asset 204) has been displayed on the open web channel 130.

The online based digital media content distribution platform (e.g., online platform(s) 140) and the open web channels 130 may each be configured to suppress or allow the digital media asset (e.g., digital media asset 204) from being displayed to the user on a GUI (e.g., GUI 202) of the online based digital media content distribution platform (e.g., one of online platform 140) based on the impression frequency message.

In the example, of FIG. 5, the online based digital media content distribution platform (e.g., online platforms 140) is configured to suppress or allow the digital media asset to be displayed to the user on a GUI of the online based digital media content distribution platform based on the impression count, Boolean value, MAID, or other values or data as received from the server(s) 102 as determined at block 504.

In the example of FIG. 5, the impression frequency message may comprise the identifiers and the impressions of the users for which to allow and/or suppress digital media assets from being delivered across a network (e.g., computer network 120) and/or otherwise shown or rendered on a GUI (e.g., GUI 202) as described herein for FIG. 2.

Each of the open web channels 130 and/or online platforms 140 may track and/or may store the total impressions for each user, and then transit those back to servers 102 and/or the cloud platform to complete the feedback loop, and allow block 502 to begin anew for a further iteration, where number of impressions may be updated, and where determinations of whether to suppress or allow digital media assets (e.g., digital media asset 204) from being transmitted may be determined.

The digital media asset (e.g., digital media asset 204) may be suppressed or allowed in the same or similar ways or manners as described herein for FIG. 3 and FIG. 4, which may include not transmitting one or more digital media assets (e.g., digital media asset 204) over one or more computer networks (e.g., computer network 120) to user devices for display and rendering thereon. In this way the impression frequency message reduces digital media asset dissemination or distribution across the computer network 120, and therefore reduces resource utilization across multiple devices including the online platforms 140 that would otherwise distribute the digital media asset 204, the user's device (e.g., user computing device 111c1) that would render the digital media asset 204, and the underlying computer network itself given that fewer digital media assets (comprising graphics, text, and other payload data) would need to be transferred via the network itself.

FIG. 6 illustrates example computing instructions or code that comprises a query 600 for determining an identifier of a user, in accordance with various aspects herein. In the example of FIG. 6, example query 600 comprises SQL query computing instructions or code for mapping or converting open web IDs (e.g., TTD ids) into MAID IDs.

As shown in the example of FIG. 6, at code block 602, a table named "p_eu_media. eu_maid_exlcusion_ pants_20210204" is created.

At code block 604, both open web IDs (TTD ids) and MAID ids are mapped or converted into the table by inserting open web IDs (TTD ids) and MAID into new rows from selection and comparison of an ID graph from TTD and device type codes (e.g., IDFA codes for APPLE devices and ADIDs for ANDROID devices).

At code block 606, additional open web ID data (e.g., data from TTD) is joined with the row data determined for code block 604.

Finally, at code block 608, distinct impressions for a given campaign (e.g., Pants sample campaign") are joined with the row data determined for code block 604 and 606.

Together the code blocks create a new table and add data and impressions for a given digital media asset (e.g., digital media asset 204) as used in a certain campaign for one or more users (e.g., as identified by the open web IDs and MAID ids). Such identifier and impression data may be used in the examples herein for generation, mapping, or converting of one or more of the tables, including as described for any one or more of the methods 300, 400, and/or 500 as described for FIGS. 3, 4, and/or 5, respectively.

Figures 7A, 7B:
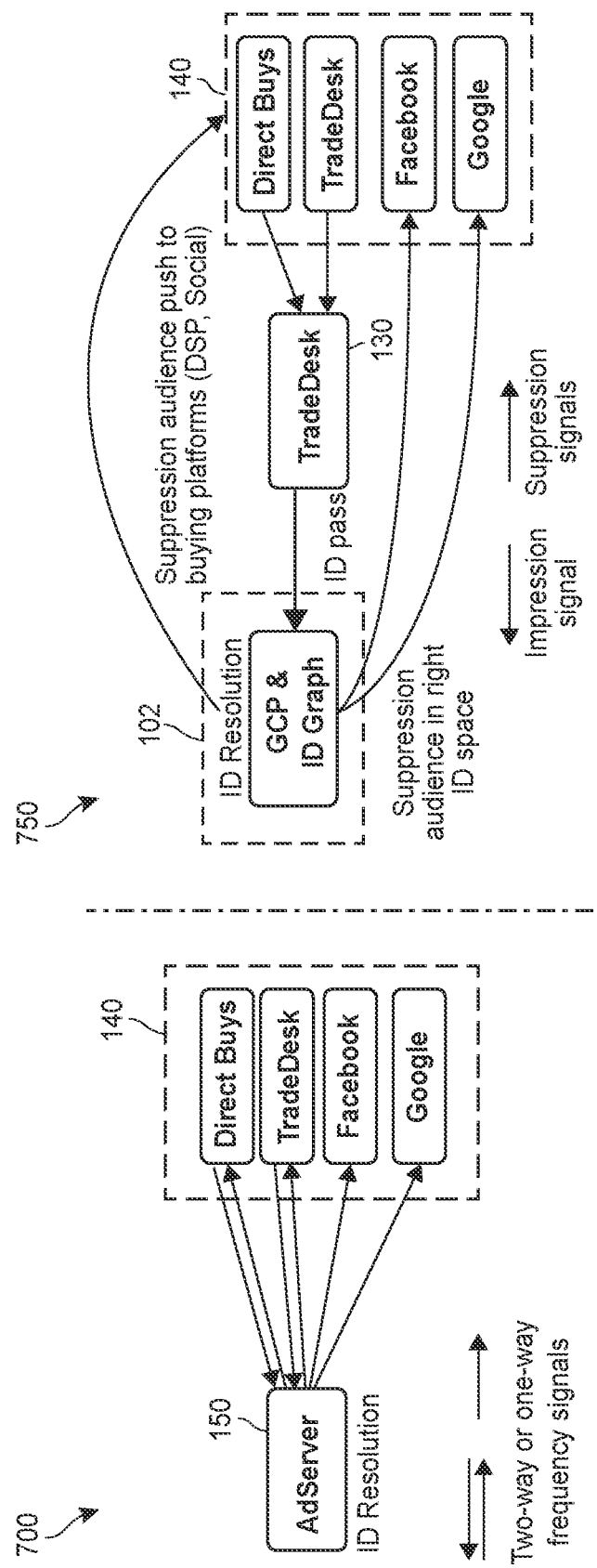
FIG. 7A depicts an example digital media distribution frequency management system, as based on an ad server implementation, and configured to reduce digital media across digital networks and platforms, in accordance with various aspects herein.
FIG. 7B depicts an example digital media distribution frequency management system, as based on an in-house server implementation, and configured to reduce digital media across digital networks and platforms, in accordance with various aspects herein.

FIG. 7A depicts an example digital media distribution frequency management system 700, as based on an ad server implementation, and configured to reduce digital media across digital networks and platforms, in accordance with various aspects herein. Digital media distribution frequency management system 700 is an implementation that utilizes ad server(s) 150 as described herein with respect to FIG. 1. It is to be understood that the disclosure herein for FIG. 1 regarding digital media distribution frequency management system 100 applies for digital media distribution frequency management system 700 for FIG. 7A. As shown for FIG. 7A, digital media distribution frequency management system 700 utilities an ad server (e.g., Ad Server(s) 150) for distributing or otherwise displaying, via a GUI, digital media assets to user(s). In various aspects, the Ad server(s) 150 may be third-party ad server(s), such as the KEVEL platform or the OPENX platform. In the aspect of digital media distribution frequency management system 700, Ad Server(s) 150 is configured with code, software, algorithms, or methods (e.g., any one or more of methods 300, 400, and/or 500 as described herein) in order to implement digital media distribution frequency management method for reducing digital media across digital networks and platforms as described herein. Such code, software, algorithms, or methods may be uploaded or otherwise provided from server(s) 102 for execution by ad server(s) 150. In such aspects, a user, executing a computing device (e.g., mobile device 111c1), may visit a website or application (app), and where the website provides display code (e.g., HTML code) or the GUI renders the client interface. Ad server(s) 150 may operate by providing, upon loading of the website or the app, a digital media asset for display on the website or app. In such aspects, the Ad server(s) may track or otherwise store a record of impressions or count of digital media asset(s) shown to user(s). As shown for FIG. 7A, such tracking or recording may be implemented by performing impression ID resolution whereby various users are tracked with respect to the digital media assets that they have respectively viewed or have otherwise been provided.

FIG. 7B depicts an example digital media distribution frequency management system 750, as based on an in-house server implementation, and configured to reduce digital media across digital networks and platforms, in accordance with various aspects herein. Digital media distribution frequency management system 750 is an implementation that utilizes ad server(s) 150 as described herein with respect to FIG. 1. It is to be understood that the disclosure herein for FIG. 1 regarding digital media distribution frequency management system 100 applies for digital media distribution frequency management system 750 for FIG. 7B. As shown for FIG. 7B, digital media distribution frequency management system 750 utilities server(s) 102 for distributing or otherwise displaying, via a GUI, digital media assets to user(s). That is, in the aspect of, FIG. 7B ad server(s) 150 are not utilized and server(s) 102 track or otherwise store a record of impressions or count of digital media asset(s) shown to user(s). As shown for FIG. 7B, such tracking or recording may be implemented by performing impression ID resolution by ID graph mapping and conversion as described herein. The impression information (e.g., such as impression IDs) may be provided by open web channels 130 as described herein. Users are tracked with respect to the digital media assets that they have respectively viewed or have otherwise been provided. Then server(s) 102 may provide suppression or allowance signals to online platforms 140, for example, as described elsewhere herein, e.g., with respect to methods 300, 400, and/or 500.

ASPECTS OF THE DISCLOSURE

The following aspects are provided as examples in accordance with the disclosure herein and are not intended to limit the scope of the disclosure.

1. A digital media distribution frequency management method for reducing digital media across digital networks and platforms, the digital media distribution frequency management method comprising: determining a set of impression identifiers (IDs) of a digital media asset as displayed on one or more graphic user interfaces (GUIs) of one or more open web digital channels; determining an identifier of a user, and an impression count of the user based on the set of impression IDs and an open web ID of the user, the impression count defining a number of times the digital media asset has been displayed to the user via the one or more GUIs of the one or more open web digital channels; and pushing an impression frequency message to an application programming interface (API) of an online based digital media content distribution platform, the impression frequency message comprising the identifier of the user, wherein the online based digital media content distribution platform is configured to suppress or allow the digital media asset to be displayed to the user on a GUI of the online based digital media content distribution platform based on the impression frequency message.

2. The digital media distribution frequency management method of aspect 1, wherein the identifier of the user comprises one or more of: a mobile ad identifier (MAID), a hashed identifier of the user, an email address of the user, a name of the user, a surname of the user, a postal address of the user, or a phone number of the user.

3. The digital media distribution frequency management method of any one of aspects 1-2, wherein the impression frequency message comprises an indication to suppress the digital media asset from being displayed when the impression count exceeds or is equal to an impression frequency threshold.

4. The digital media distribution frequency management method of any one of aspects 1-3, wherein the impression frequency message comprises an indication to allow the digital media asset to be displayed when the impression count is below an impression frequency threshold.

5. The digital media distribution frequency management method of any one of aspects 1-4, wherein the impression frequency message comprises an indication to allow the digital media asset to be displayed when the identifier of the user is identified as an exclusion.

6. The digital media distribution frequency management method of any one of aspects 1-5 further comprising: generating an open web identifier table mapping the identifier of the user to the open web ID of the user and the impression count of the user for the digital media asset as displayed to the user, wherein the impression frequency message further comprises the impression count of the user, and wherein the impression count of the user is pushed to the API, wherein the identifier of the user is mapped to a corresponding identifier of the user as stored on the online based digital media content distribution platform to determine a mapped impression count based on the impression count as pushed and a platform impression count as stored on the online based digital media content distribution platform, wherein the platform impression count defines a number of times the digital media asset has been displayed to the user on one or more GUIs of the online based digital media content distribution platform, and wherein the online based digital media content distribution platform is configured to suppress or allow the digital media asset to be displayed to the user on a GUI of the online based digital media content distribution platform based on the mapped impression count.

7. The digital media distribution frequency management method of aspect 6, wherein generation of the open web identifier table further comprises generating the open web identifier table to comprise additional identifiable information of the user comprising one or more of: hashed email information of the user, a cookie ID of the user, a name of the user, a surname of the user, a phone number, or a postal address of the user.

8. The digital media distribution frequency management method of any one of aspects 1-7 further comprising: receiving one or more platform impression IDs from one or more online based digital media content distribution platforms; wherein the set of impression IDs further comprise the platform impression IDs and further define the digital asset as displayed on one or more GUIs of one or more online based digital media content distribution platforms, and wherein the impression count further defines the number of times the digital media asset has been displayed to the user on the one or more GUIs of the one or more online based digital media content distribution platforms.

9. The digital media distribution frequency management method of aspect 8 further comprising pushing a second impression frequency message to a second application programming interface (API) of an open web digital channel, wherein the open web digital channel is configured to suppress or allow the digital media asset to be displayed to the user on a GUI of the open web digital channel based on the second impression frequency message.

10. The digital media distribution frequency management method of any one of aspects 1-9, wherein the digital media asset is suppressed, and wherein an online based asset different from the digital media asset is displayed on the GUI.

11. The digital media distribution frequency management method of any one of aspects 1-10, wherein the digital media asset is suppressed from being transmitted across a computer network to a computing device of the user when the digital media asset is to be suppressed from being displayed.

12. The digital media distribution frequency management method of any one of aspects 1-11, wherein the digital media asset is transmitted across a computer network to a computing device of the user when the digital media asset is allowed to be displayed.

13. The digital media distribution frequency management method of any one of aspects 1-12, wherein the set of impression IDs comprise impressions of the digital media asset as displayed on one or more GUIs within a time period.

14. The digital media distribution frequency management method of any one of aspects 1-13, wherein the digital media asset is suppressed or allowed to be displayed based on a push frequency defining when to push the impression frequency message to the API.

15. A digital media distribution frequency management system configured to reduce digital media across digital networks and platforms, the digital media distribution frequency management system comprising: a server comprising one or more processors and one or more memories; and computing instructions stored on the one or more memories of the server, and when executed by the one or more processors, cause the one or more processors to: determine a set of impression identifiers (IDs) of a digital media asset as displayed on one or more graphic user interfaces (GUIs) of one or more open web digital channels; determine an identifier of a user, and an impression count of the user based on the set of impression IDs and an open web ID of the user, the impression count defining a number of times the digital media asset has been displayed to the user via the one or more GUIs of the one or more open web digital channels; and push an impression frequency message to an application programming interface (API) of an online based digital media content distribution platform, the impression frequency message comprising the identifier of the user, wherein the online based digital media content distribution platform is configured to suppress or allow the digital media asset to be displayed to the user on a GUI of the online based digital media content distribution platform based on the impression frequency message.

16. A tangible, non-transitory computer-readable medium storing instructions for reducing digital media across digital networks and platforms, that when executed by one or more processors cause the one or more processors to: determine a set of impression identifiers (IDs) of a digital media asset as displayed on one or more graphic user interfaces (GUIs) of one or more open web digital channels; determine an identifier of a user, and an impression count of the user based on the set of impression IDs and an open web ID of the user, the impression count defining a number of times the digital media asset has been displayed to the user via the one or more GUIs of the one or more open web digital channels; and push an impression frequency message to an application programming interface (API) of an online based digital media content distribution platform, the impression frequency message comprising the identifier of the user, wherein the online based digital media content distribution platform is configured to suppress or allow the digital media asset to be displayed to the user on a GUI of the online based digital media content distribution platform based on the impression frequency message.

Additional Considerations

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A digital media distribution frequency management method for reducing digital media across digital networks and platforms, the digital media distribution frequency management method comprising:
   determining a set of impression identifiers (IDs) of a digital media asset as displayed on one or more graphic user interfaces (GUIs) of a plurality of open web digital channels;
   determining an identifier of a user, and an impression count of the user based on the set of impression IDs and an open web ID of the user, the impression count defining a number of times the digital media asset has been displayed to the user via the one or more GUIs of the the plurality of open web digital channels;
   pushing an impression frequency message to an application programming interface (API) of an online based digital media content distribution platform, the impression frequency message comprising the identifier of the user,
   wherein the online based digital media content distribution platform is configured to suppress or allow the digital media asset to be displayed to the user on a GUI of the online based digital media content distribution platform upon indication by the impression frequency message when pushed to the online based digital media content distribution platform; and
   generating an open web identifier table mapping the identifier of the user to the open web ID of the user and the impression count of the user for the digital media asset as displayed to the user across the plurality of open web digital channels,
   wherein the online based digital media content distribution platform is configured to suppress or allow the digital media asset to be displayed to the user on a GUI of the online based digital media content distribution platform based on the mapped impression count.

2. The digital media distribution frequency management method of claim 1, wherein the identifier of the user comprises one or more of: a mobile ad identifier (MAID), a hashed identifier of the user, an email address of the user, a name of the user, a surname of the user, a postal address of the user, or a phone number of the user.

3. The digital media distribution frequency management method of claim 1: wherein the impression frequency message comprises an indication to suppress the digital media asset from being displayed when the impression count exceeds or is equal to an impression frequency threshold.

4. The digital media distribution frequency management method of claim 1: wherein the impression frequency message comprises an indication to allow the digital media asset to be displayed when the impression count is below an impression frequency threshold.

5. The digital media distribution frequency management method of claim 1: wherein the impression frequency message comprises an indication to allow the digital media asset to be displayed when the identifier of the user is identified as an exclusion.

6. The digital media distribution frequency management method of claim 1,
   wherein the impression frequency message further comprises the impression count of the user, and wherein the impression count of the user is pushed to the API,
   wherein the identifier of the user is mapped to a corresponding identifier of the user as stored on the online based digital media content distribution platform to determine a mapped impression count based on the impression count as pushed and a platform impression count as stored on the online based digital media content distribution platform, and
   wherein the platform impression count defines a number of times the digital media asset has been displayed to the user on one or more GUIs of the online based digital media content distribution platform.

7. The digital media distribution frequency management method of claim 6, wherein generation of the open web identifier table further comprises generating the open web identifier table to comprise additional identifiable information of the user comprising one or more of: hashed email information of the user, a cookie ID of the user, a name of the user, a surname of the user, a phone number, or a postal address of the user.

8. The digital media distribution frequency management method of claim 1 further comprising:
   receiving one or more platform impression IDs from one or more online based digital media content distribution platforms;
   wherein the set of impression IDs further comprise the platform impression IDs and further define the digital asset as displayed on one or more GUIs of one or more online based digital media content distribution platforms, and
   wherein the impression count further defines the number of times the digital media asset has been displayed to the user on the one or more GUIs of the one or more online based digital media content distribution platforms.

9. The digital media distribution frequency management method of claim 8 further comprising pushing a second impression frequency message to a second application programming interface (API) of an open web digital channel,
   wherein the open web digital channel is configured to suppress or allow the digital media asset to be displayed to the user on a GUI of the open web digital channel based on the second impression frequency message.

10. The digital media distribution frequency management method of claim 1, wherein the digital media asset is suppressed, and wherein an online based asset different from the digital media asset is displayed on the GUI.

11. The digital media distribution frequency management method of claim 1, wherein the digital media asset is suppressed from being transmitted across a computer network to a computing device of the user when the digital media asset is to be suppressed from being displayed.

12. The digital media distribution frequency management method of claim 1, wherein the digital media asset is transmitted across a computer network to a computing device of the user when the digital media asset is allowed to be displayed.

13. The digital media distribution frequency management method of claim 1, wherein the set of impression IDs comprise impressions of the digital media asset as displayed on one or more GUIs within a time period.

14. The digital media distribution frequency management method of claim 1, wherein the digital media asset is suppressed or allowed to be displayed based on a push frequency defining when to push the impression frequency message to the API.

15. A digital media distribution frequency management system configured to reduce digital media across digital networks and platforms, the digital media distribution frequency management system comprising:

a server comprising one or more processors and one or more memories; and computing instructions stored on the one or more memories of the server, and when executed by the one or more processors, cause the one or more processors to:

determine a set of impression identifiers (IDs) of a digital media asset as displayed on one or more graphic user interfaces (GUIs) of one or more open web digital channels; determine an identifier of a user, and an impression count of the user based on the set of impression IDs and an open web ID of the user, the impression count defining a number of times the digital media asset has been displayed to the user via the one or more GUIs of the one or more open web digital channels;

push an impression frequency message to an application programming interface (API) of an online based digital media content distribution platform, the impression frequency message comprising the identifier of the user, wherein the online based digital media content distribution platform is configured to suppress or allow the digital media asset to be displayed to the user on a GUI of the online based digital media content distribution platform upon indication by the impression frequency message when pushed to the online based digital media content distribution platform; and generate an open web identifier table mapping the identifier of the user to the open web ID of the user and the impression count of the user for the digital media asset as displayed to the user across the plurality of open web digital channels, wherein the online based digital media content distribution platform is configured to suppress or allow the digital media asset to be displayed to the user on a GUI of the online based digital media content distribution platform based on the mapped impression count.

16. A tangible, non-transitory computer-readable medium storing instructions for reducing digital media across digital networks and platforms, that when executed by one or more processors cause the one or more processors to:

determine a set of impression identifiers (IDs) of a digital media asset as displayed on one or more graphic user interfaces (GUIs) of one or more open web digital channels;

determine an identifier of a user, and an impression count of the user based on the set of impression IDs and an open web ID of the user, the impression count defining a number of times the digital media asset has been displayed to the user via the one or more GUIs of the one or more open web digital channels;

push an impression frequency message to an application programming interface (API) of an online based digital media content distribution platform, the impression frequency message comprising the identifier of the user, wherein the online based digital media content distribution platform is configured to suppress or allow the digital media asset to be displayed to the user on a GUI of the online based digital media content distribution platform upon indication by the impression frequency message when pushed to the online based digital media content distribution platform; and generate an open web identifier table mapping the identifier of the user to the open web ID of the user and the impression count of the user for the digital media asset as displayed to the user across the plurality of open web digital channels, wherein the online based digital media content distribution platform is configured to suppress or allow the digital media asset to be displayed to the user on a GUI of the online based digital media content distribution platform based on the mapped impression count.

\* \* \* \* \*